Nov. 13, 1945.  E. C. DENCH  2,388,727
GLOSSMETER
Filed May 29, 1942
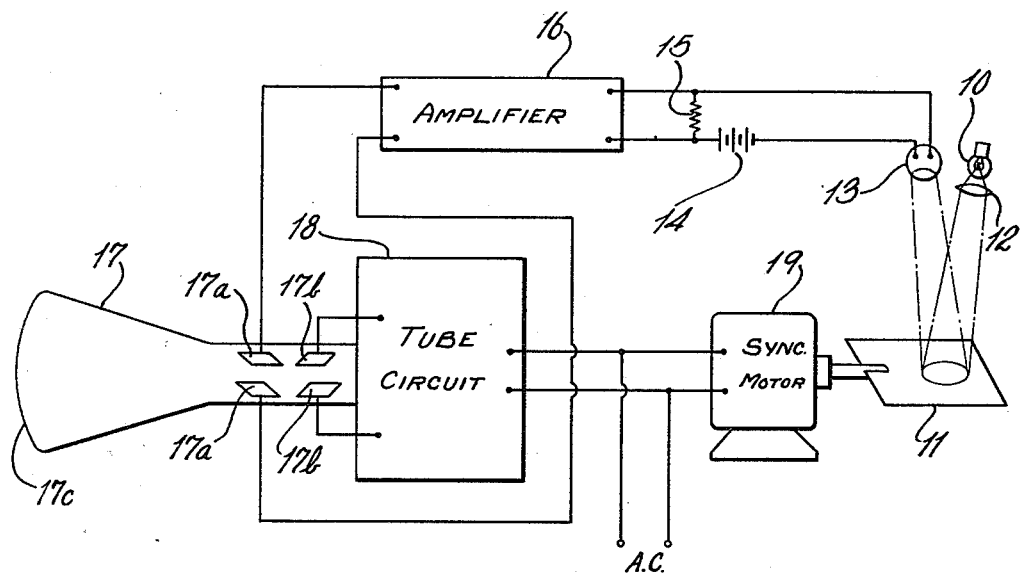
INVENTOR
EDWARD C. DENCH
BY
Milton Zucker
ATTORNEY Patented Nov. 13, 1945

2,388,727

UNITED STATES PATENT OFFICE 2,388,727

GLOSSMETER

Edward C. Dench, South Orange, N. J., assignor to Interchemical Corporation, New York, N. Y., a corporation of Ohio Application May 29, 1942, Serial No. 445,104

2 Claims. (Cl. 88—14)

This invention pertains to the measurement of surface reflection, and it is particularly directed to a system for determining the reflectance characteristic of a given surface.

In the comparison of paints and similar coating compositions it has heretofore been necessary to compare actual samples under the lighting conditions desired in order to determine an accurate match. In an attempt to obviate the need of a "standard" sample for direct comparison various devices have been constructed for the purpose of measuring the percentage of light reflected from the specimen surface at all angles of reflection, for a given angle of incidence. The data so obtained may then be translated into a curve the shape of which is an indication of the reflectance characteristic of the surface under investigation. This method, however, is cumbersome and tedious and there is always the chance for error in the calculations.

This invention provides a system for determining the reflectance characteristic of a surface immediately in the form of a curve, thus obviating all calculations. Also the surface may be simultaneously compared with another surface, accurately and analytically because the system of this invention provides a direct comparison of the reflectance characteristics of the surfaces in the form of two superimposed curves. Under certain circumstances three or more surfaces may be simultaneously compared and the comparsion may be visual or photographically recorded.

The system of this invention broadly comprises the continuous photoelectric reception of the light reflected from the surface under examination, while either the angle of incidence or angle of reception, or both, are varied through a predetermined cycle, and the application of the photoelectric response to an oscilloscope, as by the deflection of a beam of light (by means of a mirror) or a cathode ray which is caused to sweep across a screen or recording device in synchronism with the variation in the angles of incidence and/or reflection. The oscilloscope thus produces a curve the parameters of which are the amount of light reflected from the specimen surface and the angle of incidence or reflection at which it was measured. This curve is thus a graph or visual indication of the reflectance characteristic of the examined surface. By placing two different surfaces back to back and scanning them alternately, the characteristic curves of each will appear together and direct comparison of their reflectance characteristics is thus possible.

In order that the invention may be clearly understood a typical embodiment thereof is described, having reference to the accompanying drawing.

Referring to the drawing, a source of light 10 illuminates a portion of a specimen surface 11 by aid of a lens 12. Light reflected from the surface 11 is received by a light responsive element, such as a photocell or electron multiplier 13 which is connected in series with a source of electromotive force 14 and impedance 15. In this way the amount of light received by the element 13 is translated into a voltage across the impedance 15. This voltage is applied to the input of an amplifier 16 the output of which is applied to one pair of deflection plates 17a of a cathode ray tube 17, preferably the pair which control the vertical deflection.

A second pair of deflection plates 17b, which control the horizontal deflection of the cathode ray are connected to a sweep circuit embodied in the standard cathode ray tube circuit 18. The sweep circuit operates to cause the cathode ray to sweep horizontally across the end of the tube 17, where there may be a fluorescent screen 17c, periodically a predetermined number of times per second, or cycles.

The photocell 13 is caused to scan the light reflected from the surface 11 progressively through all angles of reflection by rotating the surface 11 by means of a motor 19. This causes the cathode ray to be periodically deflected horizontally in accordance with the instantaneous angular position of the surface 11. By synchronizing the horizontal sweep of the cathode ray with the rotation of the motor 19, the horizontal deflection of the cathode ray may be made proportional to the angular position of the surface 11, and the cathode ray will then trace a curve on the screen 17c which represents the proportion of light reflected by the surface 11 as a function of the latter's angular displacement. This is to say, the curve indicates the reflection characteristic of the surface 11.

There are several conventional ways of synchronizing the sweep frequency with the rotation of the motor 19, but the simplest is probably that illustrated in the drawing. As shown, the motor 19 is of the synchronous type and the alternating current employed for its operation also is used to control the sweep frequency of the cathode ray in conventional manner.

If the sweep frequency is adjusted to cause the cathode ray to sweep across the screen 17c once for each half revolution of the motor 19, it is a simple matter to compare a second surface with the surface 11 by placing it back to back against the surface 11. In this way the cathode ray alternately traces the characteristic curve of each surface, and to the eye the curves appear simultaneously and superimposed (horizontally) on the screen 17c. If the cathode ray sweeps across the screen 17c once for each complete revolution of the motor 19, the two curves will appear side by side on the screen 17c.

If the reflection characteristic over a full 180° of reflection is not needed, three or more surfaces may be simultaneously compared by placing them in the form of a three or more sided prism and rotating the prism about its major axis. Since the cathode ray will then trace the curve of each surface successively, all of the curves will appear simultaneously on the screen.

Although the system shown in the drawing is the most practical, it has the disadvantage, for some types of measurement, in that the angle of incidence as well as the angle of reflection of the light on the surface 11 change during rotation of the surface 11. If desired, the angle of incidence may be held constant by rotating the photocell, suitably mounted with slip ring contacts, around the surface 11 holding the latter stationary. Similarly, the light source 10 and lens 12 may be revolved around the surface 11 while the latter and the photocell 13 remain motionless. Finally, it is expedient for some measurements to scan the angle of reflection through a predetermined arc, rather than through a complete circle. This may be done by oscillating the surface 11 by means of well known mechanical devices. Alternatively, the photocell 13 or light source 10 and lens 12 may be rocked back and forth in front of the surface 11.

If the rotation of the motor 19 is out of phase with the sweep circuit, the curve may be centered on the screen 17c by several well known methods, such as, for example, turning the field coil of the motor in or opposite to the direction of rotation.

Various filters may be employed to measure the reflection characteristic by monochromatic light, or even polarized light. Also any combination of angular relations between the photocell 13, the surface 11 and the light source 10 may be used, although the combination shown permits the widest range of angles over which measurement can be taken unless a beam splitter is used. The disadvantage of using a beam splitter is that the amount of light which reaches the photocell is greatly reduced, but where the angles of incidence and reflection must be 90°, a beam splitter of course must be used.

The system described has further advantages over usual methods of measurement in that small samples freshly prepared may be measured without the delay attendant on waiting for the surface to dry, because the spinning of the sample causes sufficient air circulation to provide its own ventilation. This spinning also serves to cool the sample and prevent overheating where intense illumination is employed.

I claim:

1. A system for comparing the reflection characteristics of a plurality of substantially flat surfaces, which comprises means to support samples having flat surfaces for rotation about an axis, said samples being supported equidistantly from said axis with one pair of opposite edges of each sample parallel to said axis, said samples being arranged immediately adjacent to one another along said opposite edges to form a continuous light-reflecting track, means for rotating the sample-supporting means about said axis, a light source for successively illuminating said samples as they are rotated, light-responsive means arranged to receive the light successively reflected from said samples as they are rotated, an oscilloscope, means to cause the oscilloscope beam to deflect in synchronism with the rotation of said samples about said axis, and means connecting the light-responsive means and the oscilloscope to deflect the oscilloscope beam at right angles to its synchronous deflection in accordance with the light received by said light-responsive means, the sweep frequency of said oscilloscope beam being synchronized with the rotation of said samples so that the curves traced on the oscilloscope screen as the samples are successively rotated are simultaneously visible.

2. A system for comparing the reflection characteristics of a pair of substantially flat surfaces, which comprises means to support samples having flat surfaces back-to-back for rotation about an axis, means for rotating the sample-supporting means about said axis, a light source for successively illuminating said samples as they are rotated, light-responsive means arranged to receive the light successively reflected from said samples as they are rotated, an oscilloscope, means to cause the oscilloscope beam to deflect in synchronism with the rotation of said samples about said axis, and means connecting the light-responsive means and the oscilloscope to deflect the oscilloscope beam at right angles to its synchronous deflection in accordance with the light received by said light-responsive means, the sweep frequency of said oscilloscope beam being synchronized with the rotation of said samples so that the curves traced on the oscilloscope screen as the samples are successively rotated are simultaneously visible.

EDWARD C. DENCH.